United States Patent
Veerepalli et al.

(10) Patent No.: US 8,358,687 B2
(45) Date of Patent: Jan. 22, 2013

(54) METHOD AND APPARATUS FOR RECEIVING MULTIPLE SIMULTANEOUS STREAM BURSTS WITH LIMITED DVB RECEIVER MEMORY

(75) Inventors: Siva Veerepalli, San Diego, CA (US); Sandeep Singhai, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1175 days.

(21) Appl. No.: 12/204,785

(22) Filed: Sep. 4, 2008

(65) Prior Publication Data
US 2009/0080512 A1 Mar. 26, 2009

Related U.S. Application Data

(60) Provisional application No. 60/970,922, filed on Sep. 7, 2007, provisional application No. 60/971,531, filed on Sep. 11, 2007.

(51) Int. Cl.
*H04N 7/12* (2006.01)
(52) U.S. Cl. ......... 375/240.01; 375/240.02; 375/240.04; 375/240.06; 375/240.09
(58) Field of Classification Search . 375/240.01–240.09
See application file for complete search history.

(56) References Cited

U.S. PATENT DOCUMENTS

| | | | |
|---|---|---|---|
| 6,359,911 B1* | 3/2002 | Movshovich et al. | 370/536 |
| 6,404,776 B1* | 6/2002 | Voois et al. | 370/468 |
| 6,792,047 B1* | 9/2004 | Bixby et al. | 375/240.26 |
| 6,907,001 B1* | 6/2005 | Nakayama et al. | 370/230 |
| 7,451,378 B2* | 11/2008 | Gubbi et al. | 714/752 |
| 7,584,495 B2* | 9/2009 | Hannuksela et al. | 725/101 |
| 7,644,343 B2* | 1/2010 | Gubbi et al. | 714/776 |
| 7,864,805 B2* | 1/2011 | Hannuksela | 370/473 |
| 2005/0169092 A1 | 8/2005 | Kuo et al. | |
| 2006/0282749 A1* | 12/2006 | Guo | 714/776 |
| 2007/0038921 A1* | 2/2007 | Pekonen et al. | 714/776 |
| 2007/0237138 A1* | 10/2007 | Milstein et al. | 370/389 |
| 2007/0277077 A1* | 11/2007 | Vesma et al. | 714/755 |

(Continued)

FOREIGN PATENT DOCUMENTS

| | | |
|---|---|---|
| DE | 102004002177 A1 | 8/2005 |
| EP | 0893913 | 1/1999 |

(Continued)

OTHER PUBLICATIONS

"Digital Video Broadcasting (DVB); IP Datacast over DVB-H: Electronic Service Guide (ESG)" ETSI Meeting, XX, XX, vol. ETSI TS 102 471 V1.1.1, Apr. 1, 2006, pp. 7-15,22, XP003019497 the whole document.

(Continued)

*Primary Examiner* — Ayaz Sheikh
*Assistant Examiner* — Andrew C Lee
(74) *Attorney, Agent, or Firm* — Stanton Braden

(57) ABSTRACT

An apparatus and method for receiving multiple simultaneous stream bursts comprising determining if a frame size is smaller than a size of an available memory; determining if a priority of a first packet is lower than a priority of a second packet, wherein the frame size is of a frame for the second packet; requesting to abort processing the first packet and to de-assign the available memory from the first packet if the priority of the first packet is lower than the priority of the second packet; waiting for the size of the available memory to become equal or greater than the frame size if the priority of the first packet is not lower than the priority of the second packet; and assigning the available memory to the frame for the second packet.

50 Claims, 7 Drawing Sheets

U.S. PATENT DOCUMENTS

| | | | |
|---|---|---|---|
| 2008/0304520 A1* | 12/2008 | Hannuksela et al. | 370/498 |
| 2009/0003370 A1* | 1/2009 | Kering et al. | 370/412 |
| 2009/0007207 A1* | 1/2009 | Kashalkar et al. | 725/113 |
| 2009/0019508 A1* | 1/2009 | Oren | 725/118 |
| 2009/0055715 A1* | 2/2009 | Jashek et al. | 714/776 |
| 2009/0259920 A1* | 10/2009 | Guo et al. | 714/776 |
| 2010/0115379 A1* | 5/2010 | Gubbi et al. | 714/776 |
| 2010/0329328 A1* | 12/2010 | Kontola et al. | 375/240.02 |

FOREIGN PATENT DOCUMENTS

| | | |
|---|---|---|
| EP | 1703733 A1 | 9/2006 |
| FR | 2891973 A1 | 4/2007 |
| KR | 20080089349 A | 10/2008 |
| WO | WO2007072272 | 6/2007 |
| WO | WO2007082310 | 7/2007 |

OTHER PUBLICATIONS

DVB: "DVB-H Implementation Guidelines" Internet Citation, [Online] XP002376159 Retrieved from the Internet: URL:http://www.dvb-h-onli ne.org/PDF/Implementation%20Guidelines%20TR10237 7.VI.2.1.pdf> [retrieved on Apr. 6, 2006] p. 10,.line 45-p. 32, line 4 p. 54, line 7-p. 56, line 8.

Gallassi, G. et al.: "Bandwidth Assignment in Prioritized ATM Networks" Communications : Connecting the Future. San Diego, Dec. 2-5, 1990; [Proceedings of the Global Telecommunications Conference and Exhibition (Globecom)], New York, IEEE, US, vol. 2 of 3, Dec. 2, 1990, pp. 852-856, XP000220898 ISBN: 978-0-87942-632-3 abstract p. 0853, col. 2; figure 1.

Hebuterne, G. et al.: "A space priority queuing mechanism for multiplexing ATM channels" North-Holland Publishing. Amsterdam, NL, Computer Networks and ISDN Systems 20 (1990) 37-43, Dec. 1, 1990, XP024236350 ISSN: 0169-7552 [retrieved on Dec. 1, 1990] abstract p. 37-p. 38.

Joki, H. et al.: "A Novel Algorithm for Decapsulation and Decoding of DVB-H Link Layer Forward Error Correction" Communications, 2006. ICC 06. IEEE International Conference on, IEEE, PI, Jun. 1, 2006, pp. 5283-5288, XP031025752 ISBN: 978-1-4244-0354-7 section II : "DVB-H Link Layer" section III . A : "Hierarchical Decapsulation".

Kimbrel, Tracy: "A simple proof of the 2-competitiveness of the greedy FIFO buffering algorithm" Technical Report, [Online] No. RC23272, Jul. 13, 2004, XP002517391 1MB Research Technical Report Retrieved from the Internet: URL:http://www.research.ibm.com/> [retrieved on Mar. 2, 2009] p. 1.

DVB Document A092 :DVB-H Implementation Guidelines,Jul. 2005 URL:http://www.dvb-h-online.org/PDF/a084r1.tm2821r9.dTs102005.V1.2.1.pdf, Jul. 2005.

European Search Report—EP12171843—Search Authority—Munich—Jul. 31, 2012.

International Search Report & Written Opinion—PCT/US2008/075520, International Search Authority—European Patent Office—Jul. 14, 2009.

Taiwan Search Report—TW097134413—TIPO—Jun. 24, 2012.

\* cited by examiner

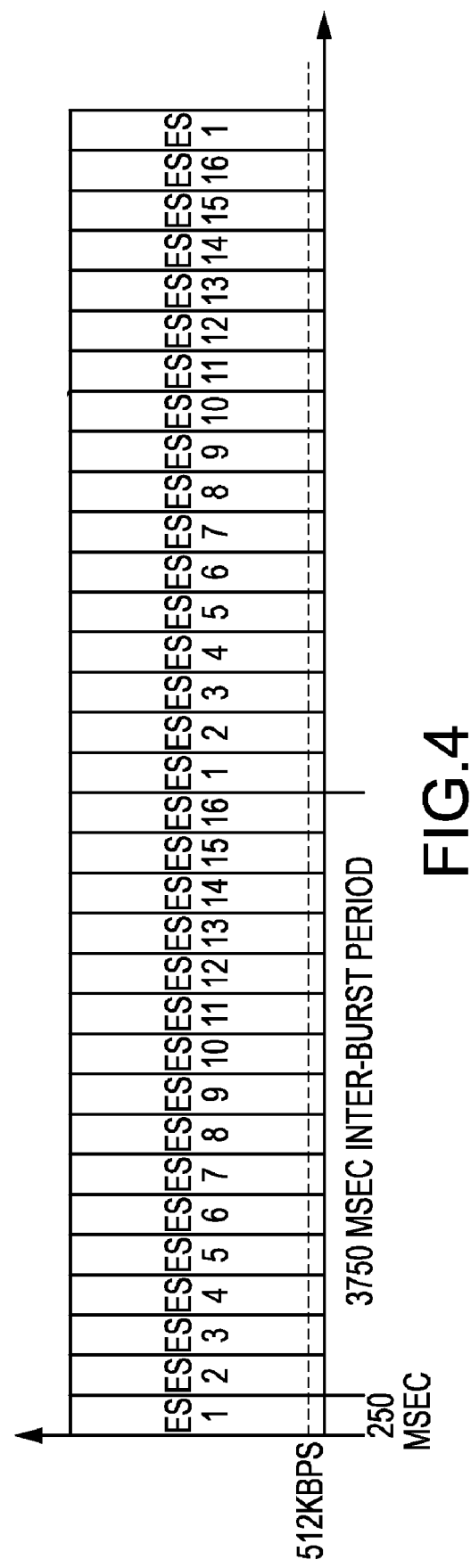

METHOD AND APPARATUS FOR RECEIVING MULTIPLE SIMULTANEOUS STREAM BURSTS WITH LIMITED DVB RECEIVER MEMORY

CLAIM OF PRIORITY UNDER 35 U.S.C. §119

The present application for patent claims priority to Provisional Application No. 60/970,922, filed Sep. 7, 2007, entitled MULTIPLE STREAM BURSTS and Provisional Application No. 60/971,531, filed Sep. 11, 2007, entitled MULTIPLE STREAM BURSTS, and assigned to the assignee hereof and hereby expressly incorporated by reference herein.

FIELD

This disclosure relates generally to apparatus and methods for receiving multiple stream bursts. More particularly, the disclosure relates to receiving multiple simultaneous stream bursts with limited DVB receiver memory.

BACKGROUND

Digital Video Broadcasting (DVB) is a family of standards for digital television applications. DVB includes both source coding (e.g., reduction of source data rate) and channel coding (e.g., improvement in transmission resiliency) methods for efficient and robust digital transmission of audiovisual information, for example, digital television. Different versions of DVB have been developed to address particular communication delivery modes. For example, DVB-S is designed for satellite broadcasting of digital TV, DVB-T is designed for terrestrial broadcasting of digital TV and DVB-C is designed for cable broadcasting of digital TV. A more recent version, digital video broadcasting-handheld (DVB-H), has been developed for mobile digital TV applications to handheld devices such as mobile telephones and personal digital assistants (PDAs).

All of the versions of DVB incorporate source coding based on the Moving Pictures Experts Group (MPEG) digital compression standards. Digital compression is a well-known digital signal processing method to reduce the source data rate by accounting for information redundancy and by coding mostly differential information, rather than only absolute information.

At any one time, multiple stream bursts of information (e.g., digital TV, file/data downloads, data multicast, etc.) may be received by a DVB receiver. The capacity of receiving simultaneous multiple stream bursts is limited by the memory size of the DVB receiver. However, increasing memory size also increases cost and DC power consumption which in turns limits battery life. In handheld devices (i.e., mobile devices), limited battery life is particularly problematic.

SUMMARY

Disclosed is an apparatus and method for receiving multiple simultaneous stream bursts with limited receiver memory. According to one aspect, a method for receiving multiple simultaneous stream bursts comprising determining if a frame size is smaller than a size of an available memory; determining if a priority of a first packet is lower than a priority of a second packet, wherein the frame size is of a frame for the second packet; requesting to abort processing the first packet and to de-assign the available memory from the first packet if the priority of the first packet is lower than the priority of the second packet; waiting for the size of the available memory to become equal or greater than the frame size if the priority of the first packet is not lower than the priority of the second packet; and assigning the available memory to the frame for the second packet. In one aspect, the method further comprising determining if it is time to wake up a receiver to receive a third packet and determining if the available memory can accommodate the third packet.

According to one aspect, a receiver comprising a processor and a processor memory, the processor memory containing program code executable by the processor for performing the following: determining if a frame size is smaller than a size of an available memory; determining if a priority of a first packet is lower than a priority of a second packet, wherein the frame size is of a frame for the second packet; requesting to abort processing the first packet and to de-assign the available memory from the first packet if the priority of the first packet is lower than the priority of the second packet; waiting for the size of the available memory to become equal or greater than the frame size if the priority of the first packet is not lower than the priority of the second packet; and assigning the available memory to the frame for the second packet. In one aspect, the frame is a Multi-Protocol Encapsulation-Forward Error Correction (MPE-FEC) frame. In one aspect, the receiver is a digital video broadcasting-handheld (DVB-H) receiver. In one aspect, the available memory resides within a demodulator of the DVB-H receiver.

According to one aspect, a handheld receiver for receiving multiple simultaneous stream bursts comprising means for determining if a frame size is smaller than a size of an available memory; means for determining if a priority of a first packet is lower than a priority of a second packet, wherein the frame size is of a frame for the second packet; means for requesting to abort processing the first packet and to de-assign the available memory from the first packet if the priority of the first packet is lower than the priority of the second packet; means for waiting for the size of the available memory to become equal or greater than the frame size if the priority of the first packet is not lower than the priority of the second packet; and means for assigning the available memory to the frame for the second packet.

According to one aspect, a computer program product, comprising a computer-readable medium including program codes stored thereon, comprising: program codes for determining if a frame size is smaller than a size of an available memory; program codes for determining if a priority of a first packet is lower than a priority of a second packet, wherein the frame size is of a frame for the second packet; program codes for requesting to abort processing the first packet and to de-assign the available memory from the first packet if the priority of the first packet is lower than the priority of the second packet; program codes for waiting for the size of the available memory to become equal or greater than the frame size if the priority of the first packet is not lower than the priority of the second packet; and program codes for assigning the available memory to the frame for the second packet.

According to one aspect, an apparatus for receiving multiple simultaneous burst streams comprising a PID manager for executing an addition or a deletion of a packet associated with a packet identifier (PID); and a protocol processor for requesting the PID manager to execute the addition or the deletion of the packet wherein the packet is received as part of the multiple simultaneous burst streams. In one aspect, the protocol processor associates at least one of a priority information, a determination time, a frame size with the packet identifier in a request message sent to the PID manager. In one aspect, the PID manager associates a slot status of deltaT_unknown to the packet identifier in the request message.

One advantage of the present disclosure includes the ability to receive simultaneous multiple stream bursts of information while using a DVB-H receiver with limited memory. Other advantages include maintaining the memory size and thus maintaining the cost of the DVB-H receiver. Additionally, the power consumption of the DVB-H receiver is maintained while allowing simultaneous reception of multiple stream bursts of information.

It is understood that other aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWINGS

FIG. 3 illustrates an example transmission timeline for one elementary stream over a 4 second burst period.

FIG. 4 illustrates an example transmission timeline for 16 different elementary streams over a 4 second burst period.

DETAILED DESCRIPTION

Figure 1:
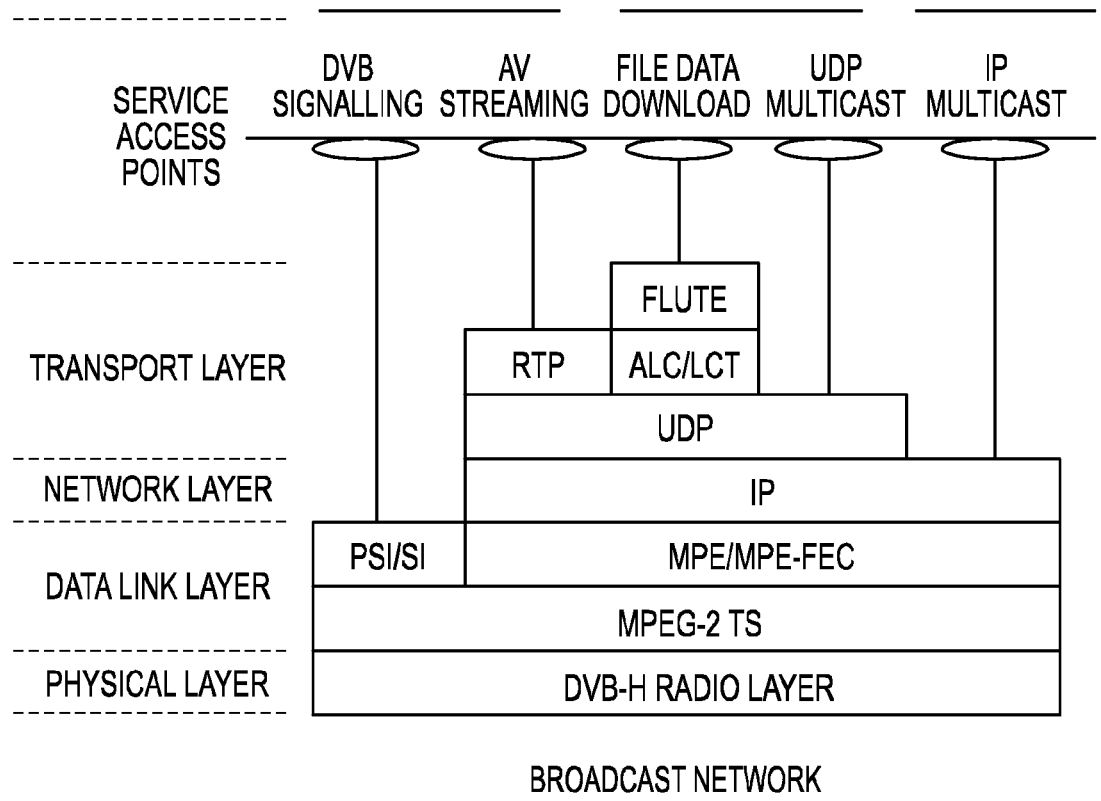
FIG. 1 illustrates an example of how various user services, including DVB signaling, audio-visual streaming, file downloading, UDP multicasting, and IP multicasting, are carried by the DVB-H protocol stack.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

DVB-H specifies several network protocol layers for mobile TV applications. The DVB-H physical layer is based on the DVB-T physical layer, with some minor additions. The DVB-H physical layer employs orthogonal frequency division multiplexing (OFDM) multi-carrier modulation. The data link layer is based on the MPEG2 transport stream (TS), as defined in ITU-T H.222.0, which is formed by multiplexing the real time encoded video and audio streams along with certain overhead data and signaling information such as the Program Specific Information/System Information (PSI/SI). An enhanced error-protection technique in the data link layer is also used to obtain reliable transmission despite propagation impairments. This technique is known as Multi-Protocol Encapsulation-Forward Error Correction (MPE-FEC) which provides additional channel coding beyond the DVB-T channel coding and time interleaving at the physical layer. In addition, a power-saving technique known as time slicing is introduced in DVB-H. Each individual service in a DVB-H transmission is sent in bursts which allows the receiver to go into sleep mode and to wake up only for reception of its intended service.

The network and transport layers utilize the Internet Protocol (IP) and User Datagram Protocol (UDP). In contrast to other DVB transmission systems, the DVB-H system employs IP to facilitate interoperability with other IP-based networks. The transport layer also includes Real-time Transport Protocol/Real-time Transport Control Protocol (RTP/RTCP) for audio-visual (A/V) streaming, and asynchronous layered coding/layered coding transport (ALC/LCT) and file delivery over unidirectional transport (FLUTE) for file object delivery. FLUTE can be used to deliver file objects of any type. Typical usage of FLUTE includes delivery of extensible markup language (XML) fragments/files and session description protocol (SDP) carrying program information and delivery of media file objects such as A/V files, pictures, logos etc. Real time video and audio streams are carried by Real-time Transport Protocol (RTP) over UDP over IP packets which are embedded into the MPEG transport stream using the Multi-Protocol Encapsulation (MPE) adaptation protocol.

FIG. 1 illustrates an example of how various user services, including DVB signaling, audio-visual streaming, file downloading, UDP multicasting, and IP multicasting, are carried by the DVB-H protocol stack. As illustrated, all user services are embedded into the MPEG2 transport stream over the DVB-H physical layer. The Program Specific Information (PSI) provides information regarding the programs (media/content) being transmitted in the MPEG2 transport stream and location information (e.g. link layer identifiers) to extract these programs from the multiplexed stream. The System Information (SI) provides network information, for example, the transmit frequencies of transport streams from a certain network, the location (transport stream, service identifiers) of certain transmitted program/IP streams, etc.

The application layer includes any applications that can take advantage of RTP/RTCP and IP multicast. Most typical applications for mobile broadcast include: Media Player for playback of real time A/V programming, media file objects, etc.; Electronic Service Guide (ESG) browser application which utilizes the XML program guide information received over FLUTE; gaming/interactivity applications based on broadcast/multicast framework.

Figure 2:
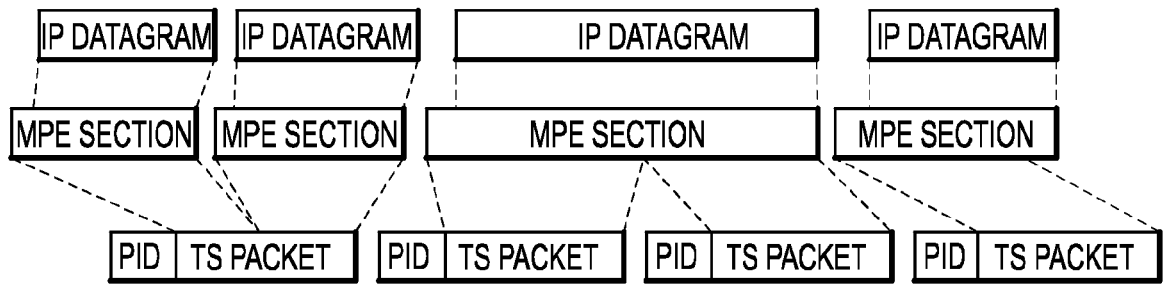
FIG. 2 illustrates an example of a protocol layer decomposition.

Each program, defined as a real time A/V stream or a FLUTE session carrying a specific set/type of objects, is part of an elementary stream (ES). Each ES may carry one or more such programs. Each elementary stream consists of or includes encapsulated IP datagrams (MPE sections) which belong to these programs. MPE sections are in turn transmitted in fixed length (188 byte). MPEG2 transport stream packets with a packet identifier (PID) that is specific to this ES. FIG. 2 illustrates an example of a protocol layer decomposition.

In DVB-H, Multi-Protocol Encapsulation-Forward Error Correction (MPE-FEC) frames (consisting of MPE sections and corresponding FEC sections) belonging to an Elementary Stream are transmitted as bursts of 512 kbits, 1024 kbits, 1536 kbits or 2048 kbits of data. These bursts of data are transmitted at a bit rate much higher than the average bit rate of a program within the elementary stream. This allows program data to be transmitted in a time-sliced manner.

In one aspect, an elementary stream (ES) consists of or includes just one program, for example, an A/V stream with an average bit rate of 512 kbps. Assuming that a burst size of 2048 kbits is used to transmit this ES, four seconds worth of data can be transmitted in this burst. If the burst was transmitted at 8 Mbps, the burst can be transmitted within 250 msec. The transmitter only has to transmit a burst of 250 msec duration once every four seconds for this program. Conversely, the receiver (e.g., DVB-H receiver) only has to receive a burst once every four seconds for 250 msec. If the transmitter used the same burst size and burst bandwidth for all elementary streams, it could transmit 16 separate elementary stream bursts, before repeating a burst. FIG. 3 illustrates an example transmission timeline for one elementary stream over a 4 second burst period. FIG. 4 illustrates an example transmission timeline for 16 different elementary streams over a 4 second burst period.

In one aspect, the DVB-H receiver wakes up only for the duration when the ES of interest is being transmitted. Each MPE section in a burst carries the relative time offset to the start of the next burst for the elementary stream, thus allowing the DVB-H receiver to compute when to wake up next to receive a burst of the same ES. This allows the DVB-H receiver to shut off RF front end and baseband processing for a majority of the time, thus saving power.

In one example, when the DVB-H receiver selects a program, the ES burst (i.e. MPE-FEC Frame) corresponding to the selected program is acquired by the DVB-H receiver and content/data from this burst is consumed by the DVB-H receiver. For example, if the size of the burst (MPE-FEC Frame) is 512 kbits, a memory sized at 512 kbits is required in the demodulator chip to receive this burst. If two bursts (MPE-FEC frames), one at 512 kbits and another at 2048 kbits belonging to two different elementary streams are received from the same burst cycle, then the memory size must be at least 2.5 Mbits.

The maximum number of elementary streams (ES) that can be received by the DVB-H receiver depends on the memory size. However, memory size of the demodulator chip has a direct impact on the silicon size, which in turn has a direct impact on the cost of the demodulator chip. In one other impact, as memory size increases, so does the power consumption. In the simplest technique of packet identifier (PID) Management, a request to add a new packet associated with a new PID is accepted by the receiver demodulator only when the sum of the MPE frame sizes for all packets associated with different PIDs (including the latest request), is less than or equal to, for example, 2 Mbits, the internal size of demodulator memory. As used in FIG. 5, the first PID refers to a first packet associated with the first PID, the second PID refers to a second packet associated with the second PID, and the third PID refers to a third packet associated with the third PID.

Figure 5:
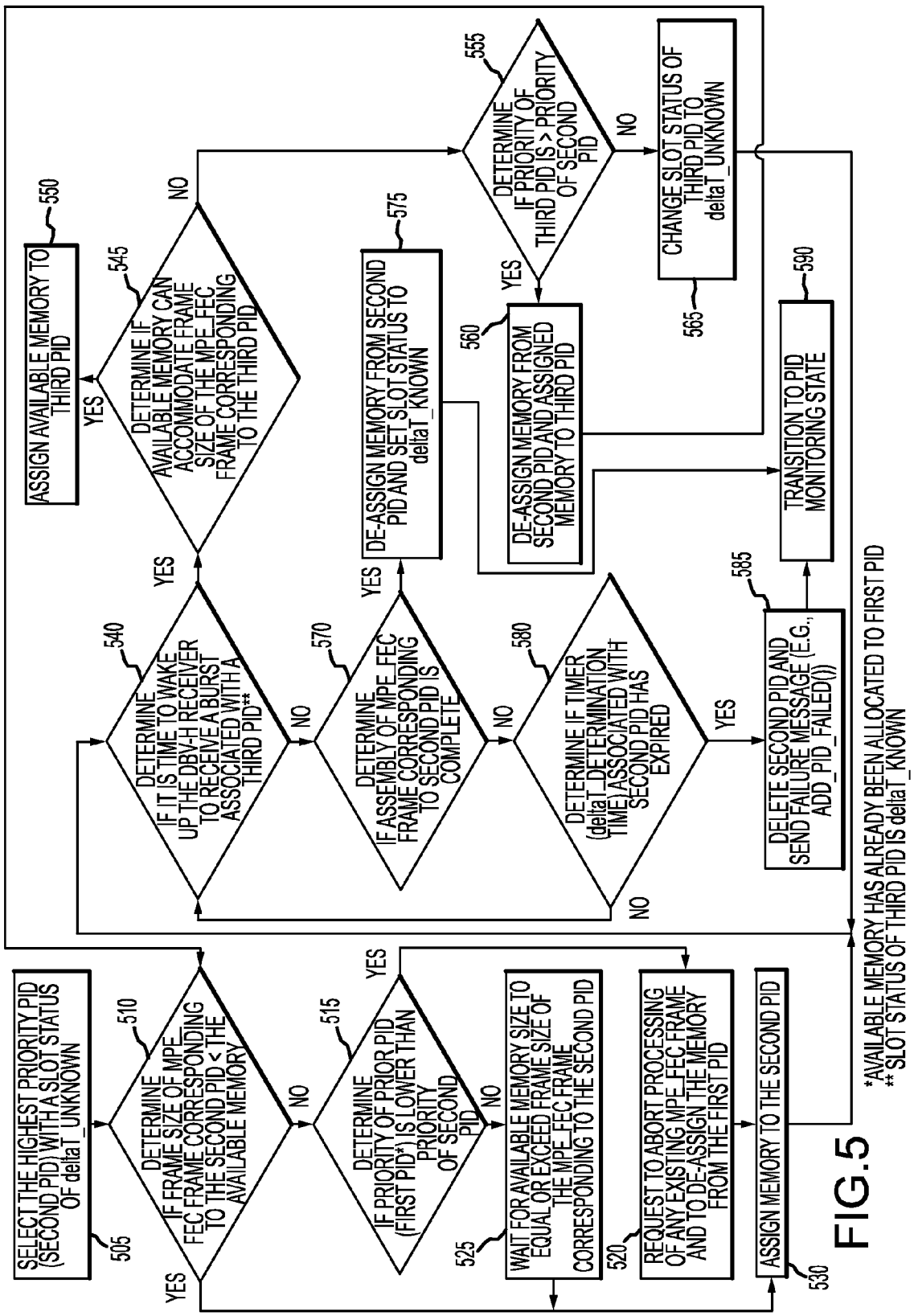
FIG. 5 illustrates an example flow diagram for receiving multiple simultaneous stream bursts with limited receiver memory.

FIG. 5 illustrates an example flow diagram for receiving multiple simultaneous stream bursts with limited receiver memory. In one aspect, the receiver is a DVB-H receiver. Illustrated in FIG. 5 is a PID management technique for supporting reception of multiple MPE-FEC frames belonging to different elementary streams within a burst cycle (for example, ES1 and ES4 in the figure above). As illustrated in FIG. 5, the sum of all the MPE-FEC frame sizes exceeds the memory provided by the demodulator chip. In one aspect, the demodulation chip resides within the DVB-H receiver. In one aspect, the algorithm illustrated in FIG. 5 is for a PID acquisition state.

In block 505, select the highest priority PID (i.e., the second PID) with a slot status of deltaT_unknown. Next, in block 510, determine if the frame size of the MPE_FEC frame corresponding to the second PID is less than the available memory. For example, the available memory is the memory size of the demodulator chip. If no burst is being received or processed, then all of the memory of the demodulator chip is available memory. If the frame size of the MPE_FEC frame corresponding to the second PID is less than the available memory, proceed to block 530. If not, proceed to block 515 to determine if the priority of a prior PID (i.e., the first PID) is lower than the priority of the second PID. If the priority of the first PID is lower than the priority of the second PID, proceed to block 520. In block 520, request the demodulator to abort processing of any existing MPE-FEC frame and to de-assign the memory from the first PID. In one aspect, the PMM makes the request to the demodulator. If the priority of the first PID is not lower (i.e., higher) than the priority of the second PID, proceed to block 525. In block 525, wait for the available memory size to equal or exceed the frame size of the MPE_FEC frame corresponding to the second PID and then proceed to block 530.

In block 530, assign memory to the second PID. Following block 530, in block 540, determine if it is time to wake up the DBV-H receiver to receive a burst associated with a third PID. If it is time to wake up the DBV-H receiver, proceed to block 545. In block 545, determine if the available memory can accommodate the frame size of the MPE_FEC frame corresponding to the third PID. In one aspect, the PMM determines the available memory. If yes, proceed to block 550 where the available memory is assigned to the third PID. If no, proceed to block 555. In block 555, determine if the priority of the third PID is higher than the priority of the second PID. In one aspect, the PMM determines the priority. If the priority of the third PID is higher than the priority of the second PID, proceed to block 560. In block 560, de-assign the memory from the second PID and assigned the memory to the third PID. Following block 560, proceed back to block 510. If the priority of the third PID is not higher (i.e., lower) than the priority of the second PID, proceed to block 565. In block 565, change the slot status of the third PID to deltaT_unknown. Following block 565, proceed back to block 540.

Following block 540, if it is not time to wake up the DBV-H receiver, determine if the assembly of the MPE_FEC frame corresponding to the second PID is complete in block 570. If the assembly is complete, proceed to block 575 to de-assign the memory from the second PID and set the slot status to deltaT_known. Following block 575, proceed to block 590. If the assembly is not complete, proceed to block 580 to determine if the timer (e.g., deltaT_determination_time) associated with the second PID has expired. In one aspect, the PMM determines the timer expiration. If the timer has expired, proceed to block 585. In block 585, delete the second PID and send a failure message (e.g., add_pid_failed( )). In one example, the failure message is sent to a DVB-H protocol processor within the DVB-H receiver. Following block 585, proceed to block 590. If the timer has not expired, proceed back to block 540. In block 590, transition to PID monitoring state.

One skilled in the art would understand that the steps disclosed in the flow diagram in FIG. 5 can be interchanged without departing from the scope and spirit of the present disclosure. Similarly, one skilled in the art would understand that the steps illustrated in the flow diagram in FIG. 5 are not exclusive and that the steps may be modified according to application or system parameters, and other steps may be included without affecting the scope and spirit of the present disclosure.

In one attempt to receive multiple stream bursts of information without using the algorithm illustrated in FIG. 5, a first add request for a PID is for a frame size of, for example, 2 Mbits. In this example, any subsequent requests to add a new PID would always result in a failure if the memory size is limited to, for example, 2 Mbits. The failure will occur even if the MPE-FEC frame corresponding to the second PID request is separated in time from the MPE-FEC frame corresponding to the first PID. After receiving a burst, a finite amount of time is required to process and flush the burst (MPE-FEC frame) out of the memory. Therefore, if two bursts, the sum of whose memory size exceeds the internal memory size, it is not possible to receive both these bursts since there will be no available memory to assign to the second burst. In part, the failure to receive the second PID occurs because the memory is statically assigned for a given burst (e.g., the first PID).

Instead, as illustrated in FIG. 5, the memory is assigned dynamically i.e., the memory is allocated when receiving the burst and de-allocated after receiving the burst. Thus, the same memory can be reassigned to another burst that appears later in time. In this way, more than one ES burst, the sum of which is greater than the memory size, can be received within one burst cycle. The algorithm illustrated in FIG. 5 allows for adding multiple new PIDs, such that the sum of the MPE-FEC frame sizes corresponding to all the PIDs added may be greater than demodulator memory. In addition, the algorithm illustrated in FIG. 5 includes priority assignment for each PID, such that the burst (MPE-FEC frame) corresponding to PID with the higher priority is assigned a higher preference for memory allocation in case of a conflict with another burst. For example, in the back-to-back bursts example, if the second burst is assigned a higher priority than the first burst, the second burst will be assigned the memory space in favor of the first burst. Assigning priority ensures that the PID with the higher priority has a better chance of being received than the PID with the lower priority. In one aspect, if the first and second bursts are separated in time long enough such that one burst is flushed out of the memory before the next one appears, the assignment of priority is not invoked since both the bursts are able to be received. In one example, PIDs corresponding to real time A/V streaming services and key streams are assigned higher priority than PIDs corresponding to non-real time services (e.g., electronic service guide (ESG), FLUTE based services, etc.).

In one aspect, the algorithm illustrated in FIG. 5 is governed by one or more of the following rules. For example, in assigning memory, a MPE-FEC frame associated with a higher priority PID preempts another MPE-FEC frame associated with a lower priority PID. In another example, set the slot status of a PID (and hence its associated MPE-FEC frame) to deltaT_known if the deltaT of the MPE-FEC frame has been determined. DeltaT is the time offset of the MPE-FEC frame to the next MPE-FEC frame within the same elementary stream (ES) in the next burst cycle. If the deltaT of the MPE-FEC frame has not been determined, set the slot status to deltaT_unknown. In one example, a timer (e.g., deltaT_determination_time) is started when the slot status is set to deltaT_unknown. The timer is aborted when the slot status changes to deltaT_known. In one example, a MPE-FEC frame size (e.g., frame_size) is specified for each PID. In one example, the timer provides a determination time which is the allotted time to acquire a new burst.

In one example a protocol processor sends a request (e.g., add_pid_request( )) to a PID manager to add one or more PIDs by specifying: PID, priority, frame_size and/or deltaT_determination_time. In one example, the default assumption is that the addition of the one or more PIDs is successful. In another example, the PID manager sends a failure message (e.g., add_pid_failed( )) to the protocol processor when the deltaT_determination_time expires before the MPE-FEC frame corresponding to the PID to be added can be acquired. In one example, the protocol processor sends a delete message (e.g., delete_pid_request( )) to request deletion of a PID filter from the PID manager. In one aspect, the PID manager maintains a PID management table (e.g., Table 1) which includes the following entries for each PID: deltaT_determination_time, frame size, priority and slot status. Table 1 illustrates example values for three PIDs.

TABLE 1

| PID | deltaT_determination_time (sec) | frame size (Mb) | priority | slot status |
|---|---|---|---|---|
| A | 8 | 1 | 1 | deltaT_known |
| B | 40 | 0.5 | 2 | deltaT_known |
| C | 14 | 0.5 | 3 | deltaT_known |

In one example, the PID manager adds one or more entries to the PID management table (e.g., Table 1) when it receives a add_pid_request( ) message from the DVB-H protocol processor. Upon addition of a new entry, the PID manager sets the slot status for the new entry to 'deltaT_unknown'. Similarly, the PID Manager deletes an entry from the PID management table (e.g., Table 1) when it receives a delete_pid_request( ) message from the DVB-H protocol processor or when a PID management module (PMM) requests for a deletion of an entry. In one aspect, the PID management module (PMM) in PID manager includes two states, PID monitoring state and PID acquisition state. Upon initialization, the PMM is in the PID monitoring state.

Figure 6:
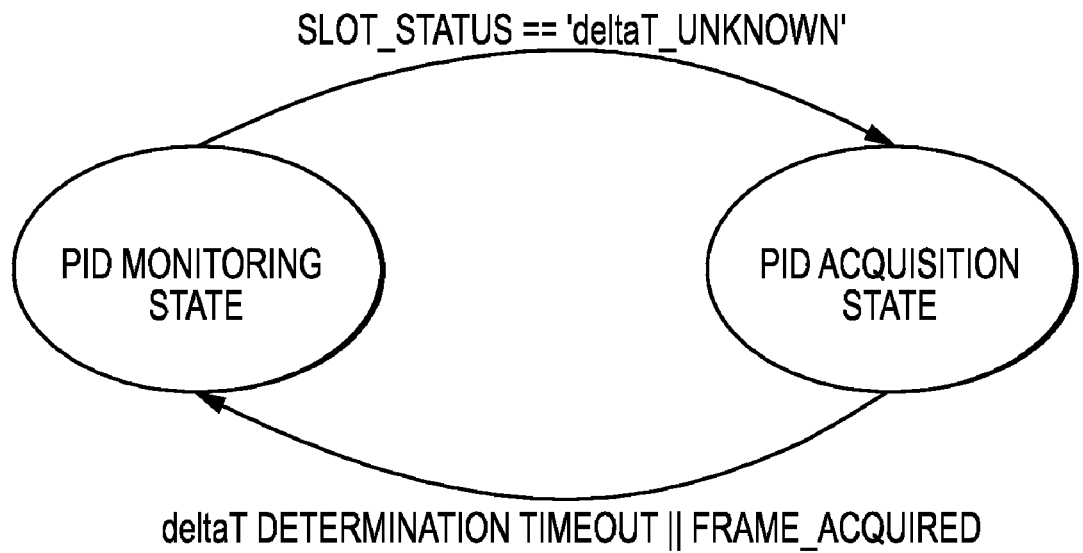
FIG. 6 illustrates the relationship between the PID monitoring state and PID acquisition state of the PID management module (PMM) in PID manager.

FIG. 6 illustrates the relationship between the PID monitoring state and PID acquisition state of the PID management module (PMM) in PID manager. Upon entering the monitoring state, the PMM checks the PID management table (e.g., Table 1). In one example, The PMM remains in the monitoring state if there are no entries in the PID management table, or if the slot status of all the entries in the PID Management Table is set to 'deltaT_known'. While in the monitoring state, if the PMM determines that it is time to wake up the DVB-H receiver to receive a burst for one of the elementary streams listed in the PID management table, the PMM will request the demodulator to assign memory to the specified PID (to receive the ES burst). After the burst has been received, processed and flushed out of the demodulator memory into the host processor, the PMM then requests de-allocation of the memory. In one aspect, if the slot status of one or more entries in the PID management table (e.g., Table 1) is set to delta-T_unknown, the PMM transitions to from the PID monitoring state to the PID acquisition state. In one example, when the PMM receives an add_pid_request from the DVB-H control element (CE) which then causes the PMM to transition to the PID acquisition state.

In one aspect, the illustration of FIG. 6 is embodied in an apparatus for receiving multiple simultaneous burst streams comprising a PID manager for executing an addition or a deletion of a packet associated with a packet identifier (PID); and a protocol processor for requesting the PID manager to execute the addition or the deletion of the packet wherein the packet is received as part of the multiple simultaneous burst streams. The protocol processor associates at least one of a priority information, a determination time, a frame size with the packet identifier in a request message sent to the PID manager. The PID manager associates a slot status of delta-T_unknown to the packet identifier in the request message. In one aspect, the PID manager maintains a PID management table of a list of packet identifiers, wherein each packet identifier in the list is associated with a priority information, a determination time, a frame size and a slot status. The PID manager deletes one of the packet identifiers from the list if a message to delete one of the packet identifiers is received from the protocol processor.

In one aspect, the PID manager comprises a PID Management Module (PMM), and the PMM further comprises a PID Monitoring State and a PID Acquisition State. The PMM enters and remains in the PID Monitoring State if there is no entries in a PID management table or if all the entries in the PID management table have a deltaT_known slot status. The PID management table comprises of a list of packet identifiers with each packet identifier in the list being associated with a priority information, a determination time, a frame size and a slot status. The PMM enters the PID Acquisition State if at least one entry in the PID management table has a deltaT_unknown slot status. The PMM sends an allocation request for allocating internal memory to a new packet when it is time to wake up to receive the new packet. The new packet is associated with one of the packet identifiers in the PID management table. The PMM sends a deallocation request for deallocation internal memory from an old packet associated with one of the packet identifiers in the PID management table, after the old packet has been received and processed. The PMM transitions from the PID Monitoring State to the PID Acquisition State when the slot status of one of the packet identifiers changes to deltaT_unknown. In one aspect, the algorithm illustrated in FIG. 5 is for the PID acquisition state.

In one example, with multiple outstanding requests, the MPE-FEC frame associated with the highest priority PID is granted request first. Additionally, the MPE-FEC frame associated with the next highest priority PID is granted request next, and so forth. One skilled in the art would understand that the rules set forth in these examples are illustrative and not comprehensive. In some cases, it is not necessary to implement one or more of the example rules mentioned herein, it is necessary to add additional rules not listed herein or a combination thereof without affecting the scope or spirit of the present disclosure.

Figure 7:
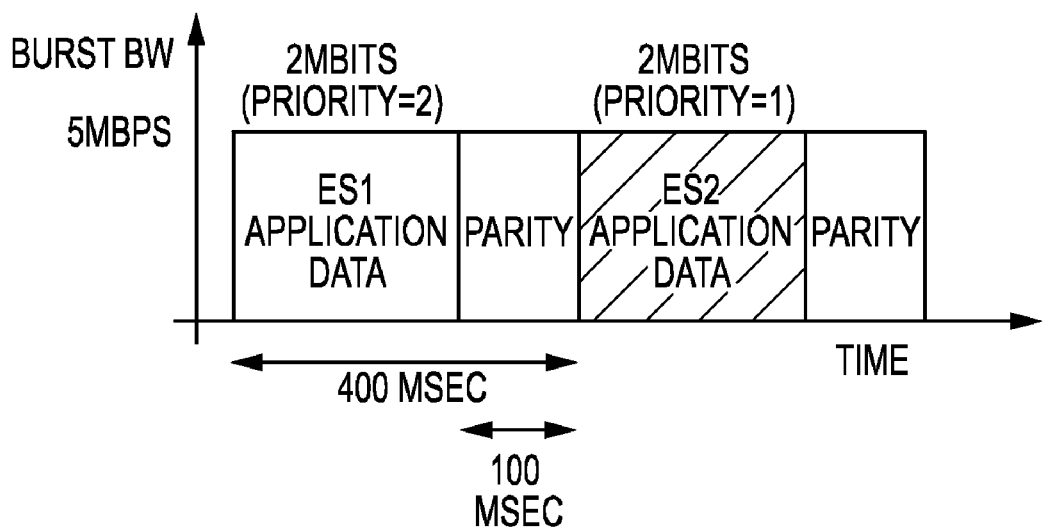
FIG. 7 illustrates a first example of two back-to-back elementary streams (ES1 and ES2) selected for reception.

Described herein are four examples illustrating back-to-back bursts. For all the examples, assume that the demodulator has a 2 Mbit memory. In a first example illustrated in FIG. 7, two back-to-back elementary streams (ES1 and ES2) are selected for reception. Priority 1 is assigned to ES2, and priority 2 is assigned to ES1. In this first example, whether or not ES1 is successfully received will depend on whether or not the ES1 application data can be flushed out of the memory before reception of ES2 (higher priority) starts. If all the application data of ES1 is received without errors (or with minimum errors), the DVB-H receiver can start to flush the ES1 application memory without waiting for the associated ES1 parity data. Thus, the ES1 application data can be flushed from the memory before the DVB-H receiver is ready to assign the memory to ES2. In this case, both ES1 and ES2 bursts are received successfully. On the other hand, if the application data of ES1 is received with errors that require the associated ES1 parity data for forward error correction, there may not be sufficient time before the DVB-H receiver is ready to assign the memory to ES2. In this latter case, ES1 is discarded and only ES2 is successfully received.

Figure 8:
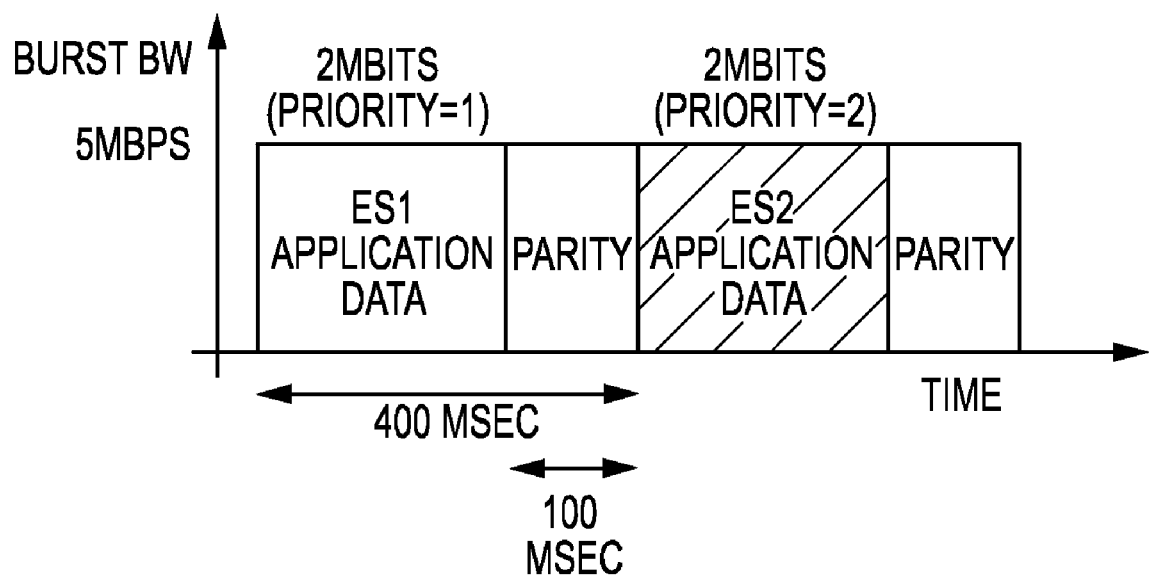
FIG. 8 illustrates a second example of two back-to-back elementary streams (ES1 and ES2) selected for reception.

FIG. 8 illustrates a second example of two back-to-back elementary streams (ES1 and ES2) selected for reception. In the second example, ES1 has a higher priority (i.e., priority 1) than ES2 (i.e., priority 2). If all the application data of ES1 is received without errors (or with minimum errors), the DVB-H receiver can start to flush the ES1 application memory without waiting for the associated ES1 parity data. Thus, the ES1 application data can be flushed from the memory before the DVB-H receiver is ready to assign the memory to the lower priority burst ES2. In this case, both ES1 and ES2 bursts are received successfully. On the other hand, if the application data of ES1 is received with errors that require the associated ES1 parity data for forward error correction, there may not be sufficient time before the DVB-H receiver is ready to assign the memory to the lower priority burst ES2. In this latter case, ES2 is not assigned the memory until ES1 application data (and associated parity data) is flushed out of the memory. In one example, only a portion of the ES2 data is received. Depending on the amount of error in the received ES2 data, error correction techniques may be applied to recover the ES2 burst.

Figure 9:
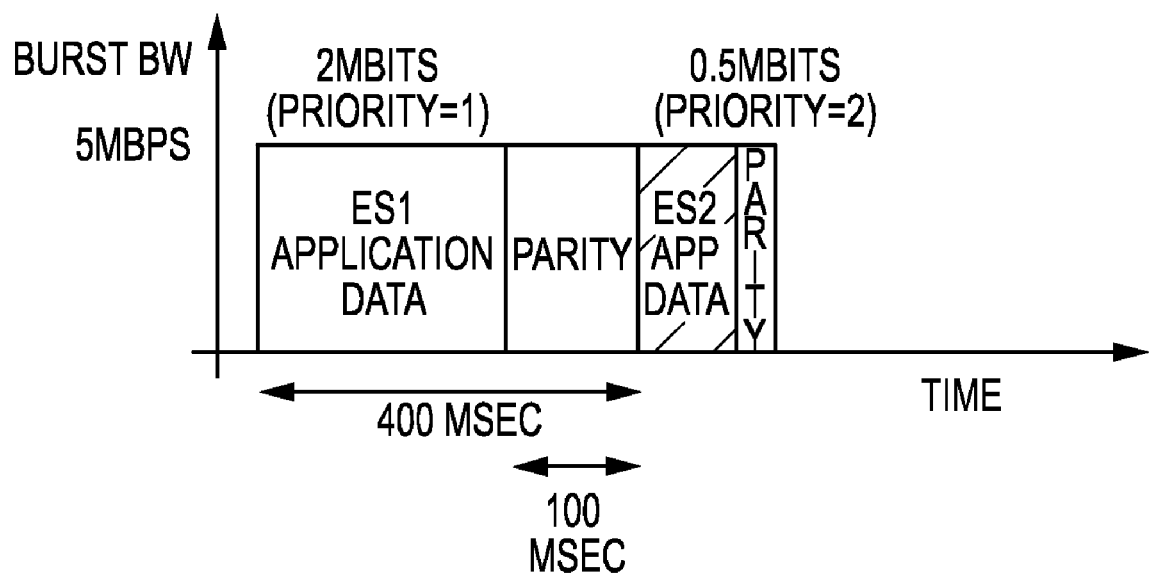
FIG. 9 illustrates a third example of two back-to-back elementary streams (ES1 and ES2) selected for reception.

FIG. 9 illustrates a third example of two back-to-back elementary streams (ES1 and ES2) selected for reception. In the third example, ES1 has a higher priority (i.e., priority 1) than ES2 (i.e., priority 2), and ES2 is a smaller burst (for example, 0.5 Mbits in size) than ES1 (for example, 2 Mbits in size). If the flushing of ES1 application data from the memory is not completed before the completion of the ES2 burst transmission, than ES2 will not be received. In another example, only a portion of the ES2 burst is received because the flushing of ES1 application data occurred simultaneously in time with the ES2 burst transmission. Since the ES2 burst is short, what is received may not allow recovery of the complete ES2 burst.

Figure 10:
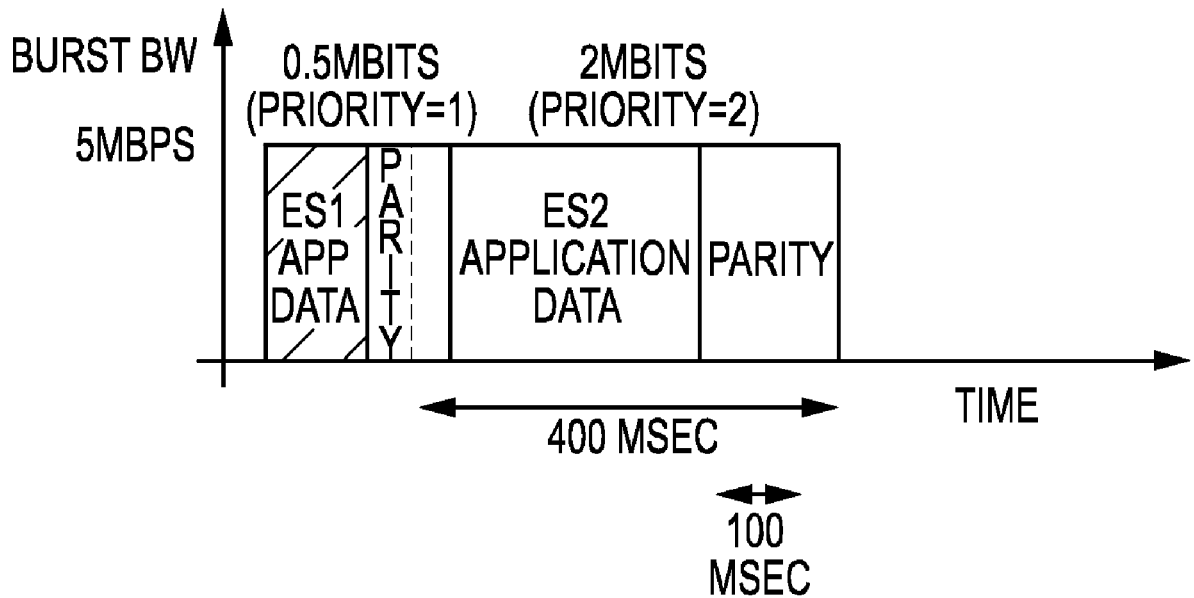
FIG. 10 illustrates a fourth example of two back-to-back elementary streams (ES1 and ES2) selected for reception.

FIG. 10 illustrates a fourth example of two back-to-back elementary streams (ES1 and ES2) selected for reception. In the third example, ES1 has a higher priority (i.e., priority 1) than ES2 (i.e., priority 2), and ES1 is a smaller burst (for example, 0.5 Mbits in size) than ES1 (for example, 2 Mbits in size). Since ES1 is a smaller burst, the time needed to flush the ES1 application data from the memory is shorter, and thus, causing little (if any) missed data from the ES2 burst transmission. Since the size of the ES2 burst is large, recovery through error correction is more likely for the missed data.

As illustrated by the four examples in FIGS. 7-10, the amount of time to receive a burst of data is dependent on the burst bandwidth (which is dependent on modulation type, code rate, guard intervals used, etc.). The amount of time to flush the data from memory is dependent on channel error rate (and hence the amount of time required for error correction), and the amount of time required to transfer the data from the demodulator memory to the host processor. Therefore, for a given channel error rate, the probability of successfully receiving back-to-back bursts whose total size is greater than the memory size is higher for lower burst bandwidth and lower for higher burst bandwidth.

Those of skill would further appreciate that the various illustrative components, logical blocks, modules and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that performs the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art.

Figure 11:
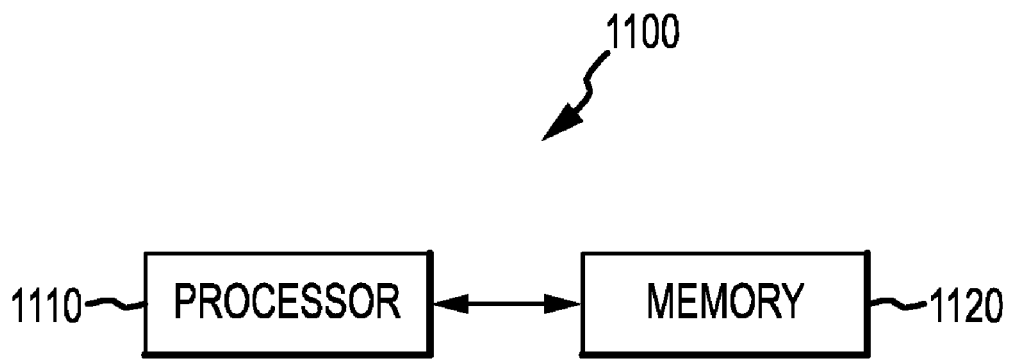
FIG. 11 illustrates an example of a device comprising a processor in communication with a memory for receiving multiple simultaneous stream bursts.

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various flow diagrams, logical blocks and/or modules described herein. FIG. 11 illustrates an example of a device 1100 comprising a processor 1110 in communication with a memory 1120 for receiving multiple simultaneous stream bursts. In one example, the device 1100 is used to implement the algorithm illustrated in FIG. 5. In one aspect, the memory 1120 is located within the processor 1110. In another aspect, the memory 1120 is external to the processor 1110.

Figure 12:
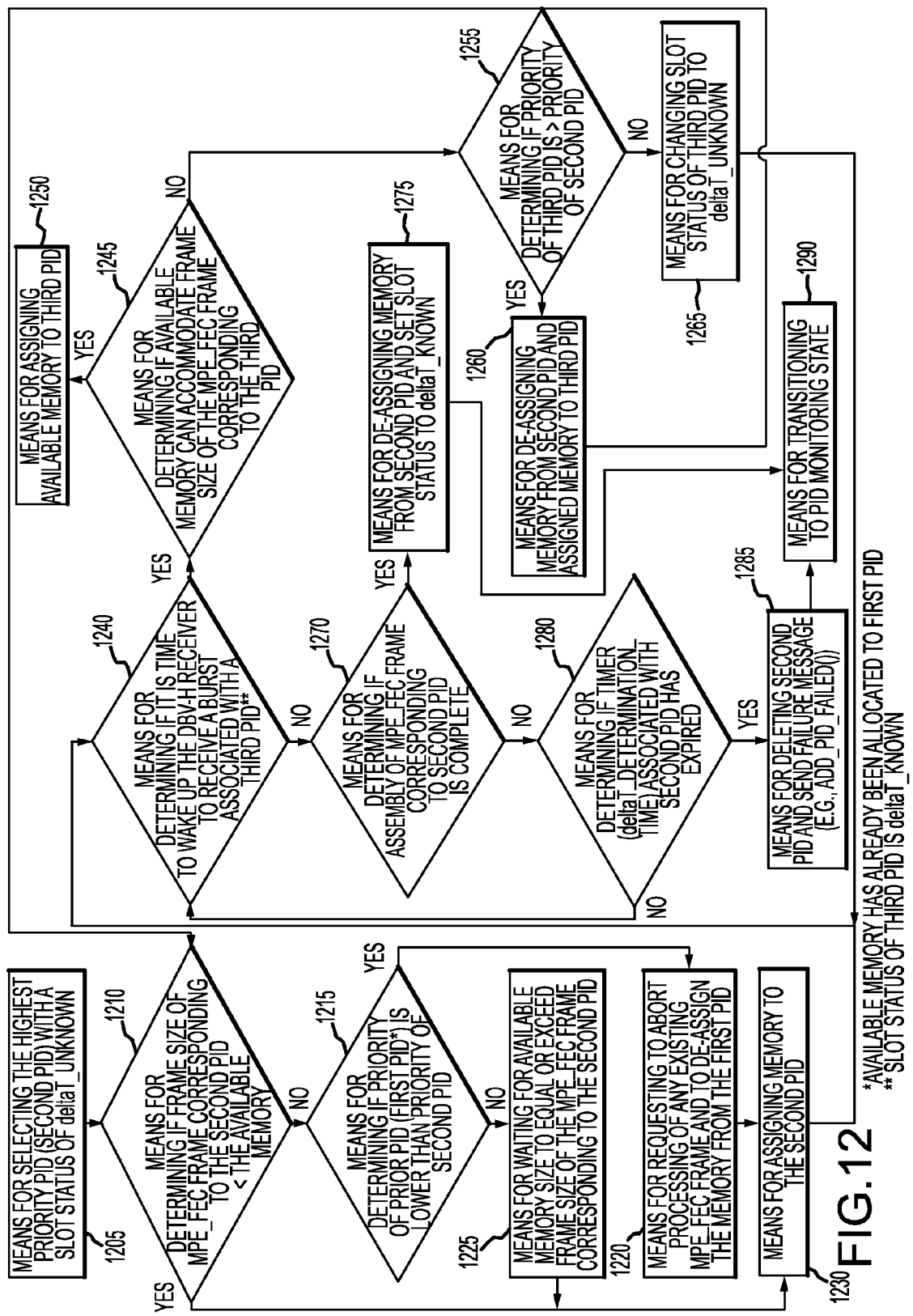
FIG. 12 illustrates an example of a device suitable for receiving multiple simultaneous stream bursts.

FIG. 12 illustrates an example of a device 1200 suitable for receiving multiple simultaneous stream bursts. In one aspect, the device 1200 is implemented by at least one processor comprising one or more modules configured to provide different aspects of receiving multiple simultaneous stream bursts with limited DVB-H receiver memory as described herein in blocks 1205, 1210, 1215, 1220, 1225, 1230, 1240, 1245, 1250, 1255, 1260, 1265, 1270, 1275, 1280, 1285 and 1290. For example, each module comprises hardware, firmware, software, or any combination thereof. In one aspect, the device 1200 is also implemented by at least one memory in communication with the at least one processor. As used in FIG. 12, the first PID refers to a first packet associated with the first PID, the second PID refers to a second packet associated with the second PID, and the third PID refers to a third packet associated with the third PID.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for receiving multiple simultaneous stream bursts comprising:
    determining if a frame size is smaller than a size of an available memory;
    determining if a priority of a first packet is lower than a priority of a second packet, wherein the frame size is of a frame for the second packet;
    requesting to abort processing the first packet and to de-assign the available memory from the first packet if the priority of the first packet is lower than the priority of the second packet;
    waiting for the size of the available memory to become equal or greater than the frame size if the priority of the first packet is not lower than the priority of the second packet; and
    assigning the available memory to the frame for the second packet.

2. The method of claim 1 wherein the second packet comprises a slot status of deltaT_unknown.

3. The method of claim 2 wherein the second packet comprises a highest priority among a plurality of packets comprising slot status of deltaT_unknown.

4. The method of claim 1 wherein the frame is a Multi-Protocol Encapsulation-Forward Error Correction (MPE-FEC) frame.

5. The method of claim 1 further comprising determining if it is time to wake up a receiver to receive a third packet.

6. The method of claim 5 further comprising determining if the available memory can accommodate the third packet.

7. The method of claim 6 further comprising assigning the available memory to the third packet.

8. The method of claim 6 further comprising determining if a priority of the third packet is greater than the priority of the second packet.

9. The method of claim 8 further comprising de-assigning the available memory from the second packet and assigning the available memory to the third packet if the priority of the third packet is greater than the priority of the second packet.

10. The method of claim 8 further comprising changing a slot status of the third packet to deltaT_unknown if the priority of the third packet is not greater than the priority of the second packet.

11. The method of claim 5 further comprising determining if an assembly of the frame for the second packet is complete.

12. The method of claim 11 further comprising de-assigning the available memory from the second packet, setting a slot status of the second packet to deltaT_known if the assembly is complete, and transitioning to a PID Monitoring State.

13. The method of claim 11 further comprising determining if a timer associated with the second packet has expired if the assembly is not complete.

14. The method of claim 13 further comprising deleting the second packet and sending a failure message to indicate failure to receive the second packet if the timer expired.

15. The method of claim 14 further comprising transitioning to a PID monitoring state.

16. The method of claim 5 wherein the receiver is a digital video broadcasting-handheld (DVB-H) receiver and the frame is a Multi-Protocol Encapsulation-Forward Error Correction (MPE-FEC) frame.

17. A receiver comprising a processor and a processor memory, the processor memory containing program code executable by the processor for performing the following:
   determining if a frame size is smaller than a size of an available memory;
   determining if a priority of a first packet is lower than a priority of a second packet, wherein the frame size is of a frame for the second packet;
   requesting to abort processing the first packet and to de-assign the available memory from the first packet if the priority of the first packet is lower than the priority of the second packet;
   waiting for the size of the available memory to become equal or greater than the frame size if the priority of the first packet is not lower than the priority of the second packet; and
   assigning the available memory to the frame for the second packet.

18. The receiver of claim 17 wherein the second packet comprises a slot status of deltaT_unknown.

19. The receiver of claim 18 wherein the second packet comprises a highest priority among a plurality of packets comprising slot status of deltaT_unknown.

20. The receiver of claim 17 wherein the frame is a Multi-Protocol Encapsulation-Forward Error Correction (MPE-FEC) frame.

21. The receiver of claim 17 wherein the processor memory further comprising program code for determining if it is time to wake up the receiver to receive a third packet.

22. The receiver of claim 21 wherein the processor memory further comprising program code for determining if the available memory can accommodate the third packet.

23. The receiver of claim 22 wherein the processor memory further comprising program code for assigning the available memory to the third packet.

24. The receiver of claim 22 wherein the processor memory further comprising program code for determining if a priority of the third packet is greater than the priority of the second packet.

25. The receiver of claim 24 wherein the processor memory further comprising program code for de-assigning the available memory from the second packet and for assigning the available memory to the third packet if the priority of the third packet is greater than the priority of the second packet.

26. The receiver of claim 24 wherein the processor memory further comprising program code for changing a slot status of the third packet to deltaT_unknown if the priority of the third packet is not greater than the priority of the second packet.

27. The receiver of claim 21 wherein the processor memory further comprising program code for determining if an assembly of the frame for the second packet is complete.

28. The receiver of claim 27 wherein the processor memory further comprising program code for de-assigning the available memory from the second packet, for setting a slot status of the second packet to deltaT_unknown if the assembly is complete, and for transitioning to a PID Monitoring State.

29. The receiver of claim 27 wherein the processor memory further comprising program code for determining if a timer associated with the second packet has expired if the assembly is not complete.

30. The receiver of claim 29 wherein the processor memory further comprising program code for deleting the second packet and for sending a failure message to indicate failure to receive the second packet if the timer expired.

31. The receiver of claim 29 wherein the processor memory further comprising program code for transitioning to a PID monitoring state.

32. The receiver of claim 21 wherein the receiver is a digital video broadcasting-handheld (DVB-H) receiver and the frame is a Multi-Protocol Encapsulation-Forward Error Correction (MPE-FEC) frame.

33. The receiver of claim 17 wherein the available memory resides within a demodulator of the receiver.

34. A handheld receiver for receiving multiple simultaneous stream bursts comprising:
   means for determining if a frame size is smaller than a size of an available memory;
   means for determining if a priority of a first packet is lower than a priority of a second packet, wherein the frame size is of a frame for the second packet;
   means for requesting to abort processing the first packet and to de-assign the available memory from the first packet if the priority of the first packet is lower than the priority of the second packet;
   means for waiting for the size of the available memory to become equal or greater than the frame size if the priority of the first packet is not lower than the priority of the second packet; and
   means for assigning the available memory to the frame for the second packet.

35. The handheld receiver of claim 34 wherein the frame is a Multi-Protocol Encapsulation-Forward Error Correction (MPE-FEC) frame.

36. The handheld receiver of claim 34 further comprising determining if it is time to wake up the handheld receiver to receive a third packet.

37. The handheld receiver of claim 36 further comprising means for determining if the available memory can accommodate the third packet.

38. The handheld receiver of claim 37 further comprising means for assigning the available memory to the third packet.

39. The handheld receiver of claim 37 further comprising means for determining if a priority of the third packet is greater than the priority of the second packet.

40. The handheld receiver of claim 39 further comprising means for de-assigning the available memory from the second packet and means for assigning the available memory to the third packet if the priority of the third packet is greater than the priority of the second packet.

41. The handheld receiver of claim 39 further comprising means for changing a slot status of the third packet to deltaT_unknown if the priority of the third packet is not greater than the priority of the second packet.

42. The handheld receiver of claim 36 further comprising means for determining if an assembly of the frame for the second packet is complete.

43. The handheld receiver of claim 42 further comprising means for de-assigning the available memory from the second packet, means for setting a slot status of the second packet to deltaT_unknown if the assembly is complete, and means for transitioning to a PID Monitoring State.

44. The handheld receiver of claim 42 further comprising means for determining if a timer associated with the second packet has expired if the assembly is not complete.

45. The handheld receiver of claim 44 further comprising means for deleting the second packet, means for sending a failure message to indicate failure to receive the second packet if the timer expired, and means for transitioning to a PID monitoring state.

46. A computer program product, comprising a non-transitory computer-readable medium including program codes stored thereon, comprising:
- program codes for determining if a frame size is smaller than a size of an available memory;
- program codes for determining if a priority of a first packet is lower than a priority of a second packet, wherein the frame size is of a frame for the second packet;
- program codes for requesting to abort processing the first packet and to de-assign the available memory from the first packet if the priority of the first packet is lower than the priority of the second packet;
- program codes for waiting for the size of the available memory to become equal or greater than the frame size if the priority of the first packet is not lower than the priority of the second packet; and
- program codes for assigning the available memory to the frame for the second packet.

47. The computer program product, comprising the non-transitory computer-readable medium including program codes stored thereon, of claim 46 further comprising:
- program codes for determining if it is time to wake up a DVB-H receiver to receive a third packet;
- program codes for determining if the available memory can accommodate the third packet; and
- program codes for assigning the available memory to the third packet.

48. The computer program product, comprising the non-transitory computer-readable medium including program codes stored thereon, of claim 46 further comprising:
- program codes for determining if it is time to wake up a DVB-H receiver to receive a third packet;
- program codes for determining if a priority of the third packet is greater than the priority of the second packet;
- program codes for de-assigning the available memory from the second packet and assigning the available memory to the third packet if the priority of the third packet is greater than the priority of the second packet; and
- program codes for changing a slot status of the third packet to deltaT_unknown if the priority of the third packet is not greater than the priority of the second packet.

49. The computer program product, comprising the non-transitory computer-readable medium including program codes stored thereon, of claim 46 further comprising:
- program codes for determining if it is time to wake up a DVB-H receiver to receive a third packet;
- program codes for determining if an assembly of the frame for the second packet is complete;
- program codes for de-assigning the available memory from the second packet and setting a slot status of the second packet to deltaT_unknown if the assembly is complete; and
- program codes for determining if a timer associated with the second packet has expired, deleting the second packet and sending a failure message to indicate failure to receive the second packet if the assembly is not complete.

50. The computer program product, comprising the non-transitory computer-readable medium including program codes stored thereon, of claim 49 further comprising:
- program codes for transitioning to a PID monitoring state.

\* \* \* \* \*